US012609781B2

(12) United States Patent (10) Patent No.: US 12,609,781 B2

Imao (45) Date of Patent: Apr. 21, 2026

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventor: Eiji Imao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 18/340,757

(22) Filed: Jun. 23, 2023

(65) Prior Publication Data

US 2023/0421279 A1 Dec. 28, 2023

(30) Foreign Application Priority Data

Jun. 27, 2022 (JP) ................................. 2022-102391

(51) Int. Cl.
H04J 3/06 (2006.01)

(52) U.S. Cl.
CPC .......... H04J 3/0641 (2013.01); H04J 3/0667 (2013.01)

(58) Field of Classification Search
CPC ...... H04J 3/0641; H04J 3/0667; H04J 3/0679; H04W 56/00; H04W 56/001; H04L 69/00
See application file for complete search history.

(56) References Cited

U.S. PATENT DOCUMENTS

| | | | |
|---|---|---|---|
| 2013/0003757 A1* | 1/2013 | Boatright ........... | H04N 21/4381 |
| | | | 370/474 |
| 2023/0065686 A1* | 3/2023 | Umasuthan ........... | H04J 3/0667 |
| 2023/0367358 A1* | 11/2023 | Manevich ............. | H04J 3/0697 |

FOREIGN PATENT DOCUMENTS

JP 2021180385 A 11/2021

* cited by examiner

*Primary Examiner* — Sulaiman Nooristany

(74) *Attorney, Agent, or Firm* — Canon U.S.A., Inc. IP Division

(57) ABSTRACT

A communication apparatus, which includes a plurality of communication control units each including a hardware clock, determines an adjustment parameter value to adjust a time of the hardware clock in a first communication control unit of the plurality of communication control units, where the first communication control unit is configured to communicate with a time distribution server. Based on a precision time protocol (PTP), the communication apparatus adjusts the time of the hardware clock in the first communication control unit using the adjustment parameter value, and adjusts a time of the hardware clock in at least one second communication control unit of the plurality of communication control units, using the adjustment parameter value, the first communication control unit being different from the second communication control unit.

8 Claims, 8 Drawing Sheets

COMMUNICATION APPARATUS, CONTROL METHOD THEREFOR, AND STORAGE MEDIUM

BACKGROUND

Field

The present disclosure relates to a time synchronization technique for synchronizing time provided from a time distribution server.

Description of the Related Art

A precision time protocol (PTP) is known as a communication protocol for time adjustment via a network. The PTP is a protocol specified in the Institute of Electrical and Electronics Engineers (IEEE) 1588-2008 (also referred to as IEEE 1588 Version 2). The use of the PTP makes it possible to synchronize a time of a client apparatus with a time of a time distribution server called a ground master clock (GMC) with high accuracy.

Specifically, the client apparatus adjusts the time of the client apparatus to be synchronized with the time of the time distribution server using a transmission timing and a reception timing of a packet based on the PTP (PTP packet). The client apparatus generally includes a communication control unit (communication interface (I/F)) including a PTP hardware clock (PHC) to communicate with the time distribution server to perform the time adjustment as described above.

While the use of the PTP makes it possible to synchronize the time of the client apparatus with the time of the time distribution server with high accuracy, it may be desirable to continuously perform PTP packet communication and time adjustment so as to maintain the synchronized state. Accordingly, if communication between the client apparatus and the time distribution server is disconnected due to occurrence of a communication line failure or the like, the time of the client apparatus cannot be synchronized with the time of the time distribution server. To deal with this issue, the client apparatus includes two communication I/Fs (main communication I/F and backup communication I/F) to communicate with the time distribution server. The client apparatus can switch the two communication I/Fs to be used. Specifically, even in a state where the main communication I/F that has been used for communication with the time distribution server is in an inoperable state, the client apparatus can continuously communicate with the time distribution server by switching the communication I/F to be used to the backup communication I/F.

In the case where the client apparatus includes two communication I/Fs, the communication I/Fs include respective PHCs. Therefore, it may be desirable to switch the communication I/Fs without causing a large difference in time between the PHCs in the communication I/Fs. Japanese Patent Application Laid-Open No. 2021-180385 discusses a method for continuously performing time synchronization processing by transferring time information (time of a PHC) about a communication I/F that is currently used to a communication I/F to which the communication I/F is switched.

According to the method discussed in Japanese Patent Application Laid-Open No. 2021-180385, the transfer of the time information about the communication I/F that is currently used to the communication I/F to which the communication I/F is switched makes it possible to continuously perform time synchronization processing. However, the time synchronization with the time distribution server may be lost during switching of the communication I/Fs. In this case, it takes a long time to synchronize the time of the PHC in the switched communication I/F with the time of the time distribution server again.

SUMMARY

Various embodiments of the present disclosure have been made in view of the above-described issues and provide techniques for maintaining a synchronized state with the time of a time distribution server before and after a communication I/F is switched.

According to an embodiment of the present disclosure, a communication apparatus includes a plurality of communication control units each including a hardware clock. The communication apparatus also includes a determination unit configured to determine an adjustment parameter value to adjust a time of the hardware clock in a first communication control unit of the plurality of communication control units, based on a precision time protocol (PTP), the first communication control unit being configured to communicate with a time distribution server. The communication apparatus also includes a first adjustment unit configured to adjust the time of the hardware clock in the first communication control unit using the adjustment parameter value, and a second adjustment unit configured to adjust a time of the hardware clock in at least one second communication control unit using the adjustment parameter value, the second communication control unit being included in the plurality of communication control units and being different from the first communication control unit.

Further features of the present disclosure will become apparent from the following description of exemplary embodiments with reference to the attached drawings.

BRIEF DESCRIPTION OF THE DRAWINGS

FIG. 1 is a block diagram illustrating a hardware configuration example of a communication apparatus according to a first exemplary embodiment.

FIG. 7 is a block diagram illustrating a hardware configuration example of a communication apparatus according to a second exemplary embodiment.

DESCRIPTION OF THE EMBODIMENTS

Figure 2:
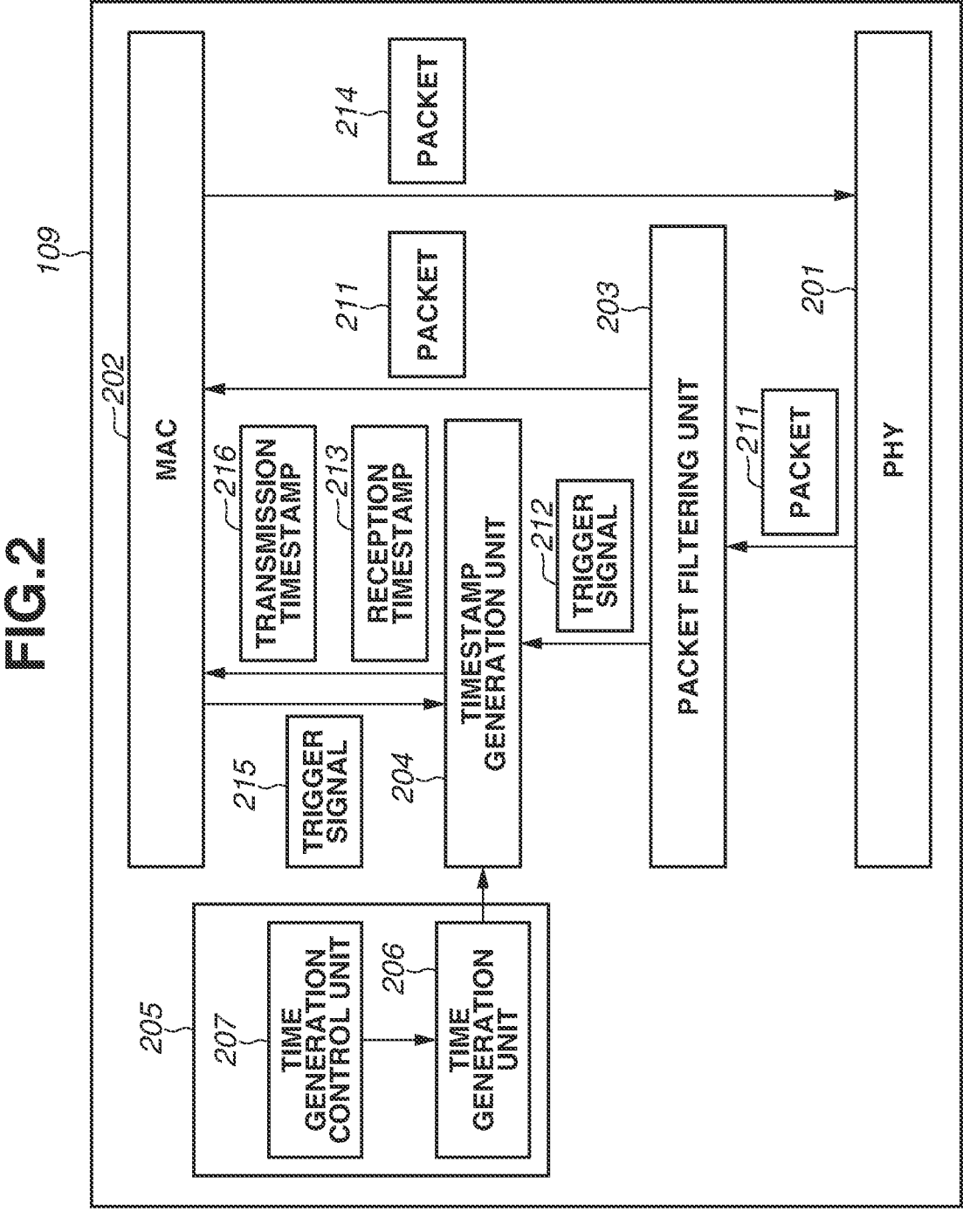
FIG. 2 is a block diagram illustrating a hardware configuration example of a communication interface (I/F).

Exemplary embodiments of the present disclosure will be described in detail below with reference to the accompanying drawings. The following exemplary embodiments are not intended to limit the scope of the invention described in the claims. Not all combinations of features described in the exemplary embodiments are deemed to be essential, and the features may be combined as needed. In the accompanying drawings, the identical or similar components are denoted by the same reference numerals, and redundant descriptions thereof are omitted.

(Hardware Configuration)

Figure 1:
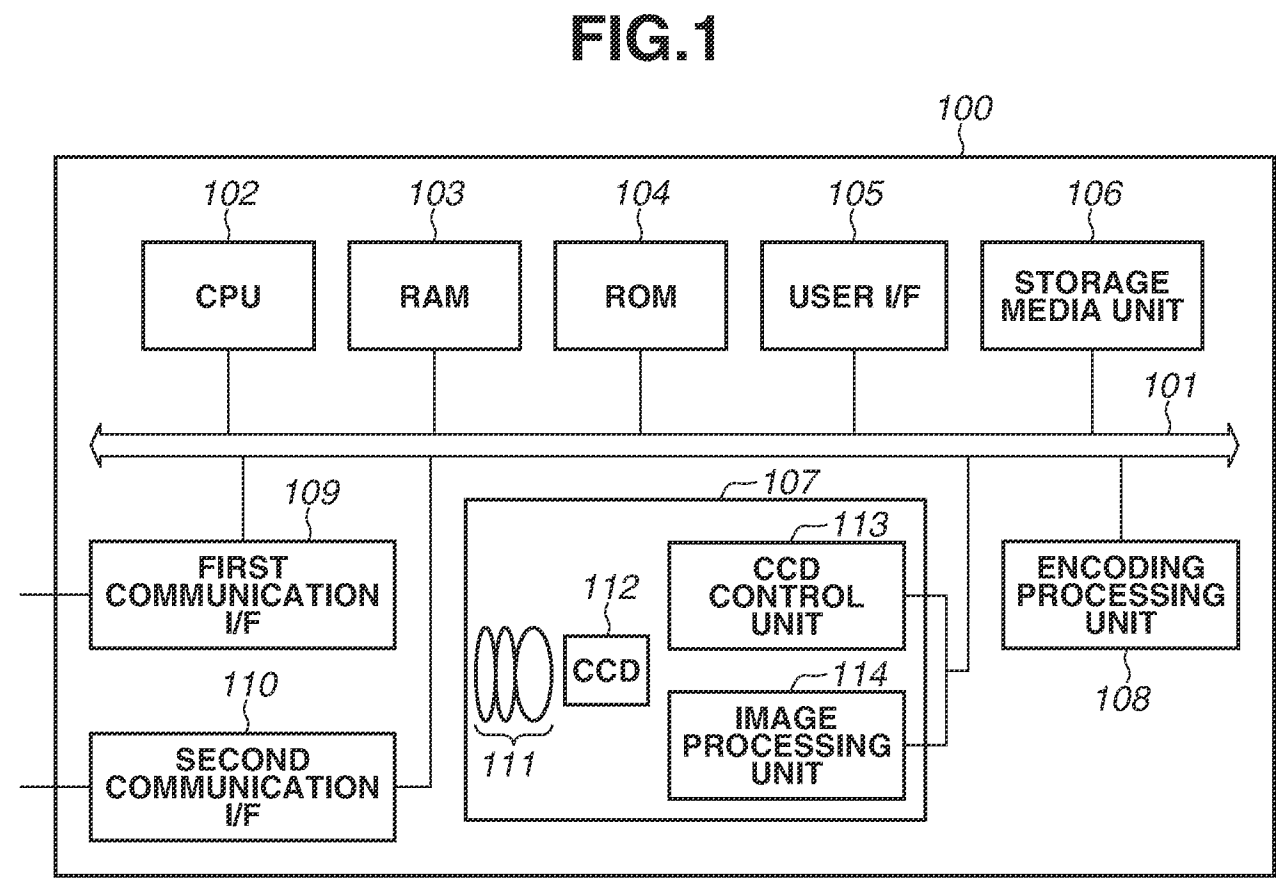

FIG. 1 is a block diagram illustrating a hardware configuration example of a communication apparatus 100 according to a first exemplary embodiment of the present disclosure. In the communication apparatus 100, a central processing unit (CPU) 102, a random access memory (RAM) 103, a read-only memory (ROM) 104, a user interface (I/F) 105, a storage media unit 106, an image capturing processing unit 107, an encoding processing unit 108, a first communication I/F 109, and a second communication I/F 110 are connected to a system bus 101. The system bus 101 transmits data between the blocks.

The ROM 104 is a non-volatile storage device that stores system programs and application programs. The RAM 103 is a temporary storage device used to execute system programs and application programs. The system programs and application programs are loaded into the RAM 103 from the ROM 104, and are executed by the CPU 102. The RAM 103 can also be used as a buffer for storing digital image signal data (captured images) output from the image capturing processing unit 107, and as a data buffer to be used for processing of creating various image files. The ROM 104 can also be used to store user setting data in the communication apparatus 100.

The CPU 102 is composed of one or more processors and controls the overall operation of the communication apparatus 100. The CPU 102 may be replaced by one or more processors such as an application-specific integrated circuit (ASIC), a field-programmable gate array (FPGA), a digital signal processor (DSP), and a graphics processing unit (GPU).

The image capturing processing unit 107 includes a lens group 111, a charge-coupled device (CCD) (photoelectric conversion element) 112, a CCD control unit 113, and an image processing unit 114. The lens group 111 is composed of a plurality of lenses to optically project an object image on the CCD 112. The CCD control unit 113 includes a timing generator for supplying a transfer clock signal and a shutter signal to the CCD 112. The transfer clock signal is used for the CCD 112 to read out electric charges accumulated in each pixel and output the electric charges as an analog signal. The shutter signal is used to determine an electric charge accumulation period (exposure period) in each pixel. The CCD control unit 113 further includes circuits for noise removal and gain processing on the output signal from the CCD 112, and an analog-to-digital (A/D) conversion circuit for converting the analog signal into a digital signal. The image processing unit 114 performs gamma transformation, color space conversion, and image processing, such as white balancing and exposure correction, on the digital signal output from the CCD control unit 113, and outputs the processed digital data, to the RAM 103, as digital image signal data (captured images) that can be encoded by the encoding processing unit 108.

The encoding processing unit 108 is a video codec, such as H. 265 (High Efficiency Video Coding (HEVC)), H. 264 (Advanced Video Coding (AVC)), or Joint Photographic Experts Group (JPEG), for moving images and still images. The encoding processing unit 108 encodes the digital image signal data (captured images) stored in the RAM 103 by the image capturing processing unit 107, and generates encoded data (encoded captured images). The encoding processing unit 108 is also configured to generate image files including the generated encoded data. The encoding processing unit 108 stores the captured images and image files in the storage media unit 106.

The user I/F 105 is an interface configured to receive an operation performed by a user. Examples of the user I/F 105 include a display and a touch sensor configured to operate the communication apparatus 100. The user I/F 105 can be operated by a graphical user interface (GUI) for an application displayed on a screen.

The storage media unit 106 is a non-volatile memory device with a large storage capacity, such as a hard disk device, a solid-state drive (SSD) device, a secure digital (SD) card, or a compact Flash® card. The storage media unit 106 stores, for example, the captured images and image files generated by the encoding processing unit 108.

The first communication I/F 109 and the second communication I/F 110 are network interfaces (physical communication I/Fs) that are connected to a network to transmit and receive packets, and each function as a communication control unit. The first communication I/F 109 and the second communication I/F 110 are connected to a time distribution server via the network as described below. Examples of the network include Ethernet® such as Gigabit Ethernet® (GbE), 10 GbE, and 100 GbE based on the Institute of Electrical and Electronics Engineers (IEEE) standards. The network may also be configured by combining interconnects, Industrial Ethernet®, and the like. The network is not limited to these examples, and other types of networks may also be used. While FIG. 1 illustrates two communication I/Fs, the number of communication I/Fs is not particularly limited as long as the communication apparatus 100 includes a plurality of communication I/Fs each including a precision time protocol (PTP) hardware clock (PHC).

Next, a configuration example of the first communication I/F 109 will be described with reference to FIG. 2. FIG. 2 is a block diagram illustrating a hardware configuration example of the first communication I/F 109. The second communication I/F 110 has a hardware configuration similar to that illustrated in FIG. 2. The first communication I/F 109 includes a PHY (hardware block for implementing physical layer functions) 201, a MAC (hardware block for transmission media control processing) 202, a packet filtering unit 203, a timestamp generation unit 204, and a PHC (PTP hardware clock) 205.

The packet filtering unit 203 determines the type of each packet received by the PHY 201. For example, the packet filtering unit 203 determines the type of a packet received by the PHY 201 based on a field value indicating the type of the packet. The field value is read from Ethernet® frame header information in the packet. The packet filtering unit 203 includes a function of discarding the received packet if the communication apparatus 100 determines that the received packet should not be received. Upon determining the received packet to be the packet that should be received by the communication apparatus 100, the packet filtering unit 203 further determines whether there is a need to generate a reception timestamp (time information indicating a reception timing) of the received packet. In the present exemplary embodiment, it may be desirable for the communication apparatus 100 to receive PTP packets and to generate the reception timestamp of the PTP packets. The PTP packets are packets for time synchronization used to perform time synchronization processing based on the PTP. The PTP packets include a Sync packet (packet including a sync message), a Follow-Up packet (packet including a follow-up message), a DelayRequest packet (packet including a delay request message), and a DelayResponse packet (packet including a delay response message).

The PHC 205 includes a time generation unit 206 and a time generation control unit 207. The time generation unit 206 is a hardware clock module that measures time and continuously supplies the timestamp generation unit 204 with time in units of nanoseconds. The time generation control unit 207 adjusts the time measured by the time generation unit 206. A time adjustment procedure will be described below.

Next, an operation of the first communication I/F 109 will be described.

In the case of receiving a packet, when the PHY 201 starts to receive the packet from the network to which the PHY 201 is connected, the packet filtering unit 203 determines the type of the packet. Upon determining that a received packet 211 should be received by the communication apparatus 100 and there is a need to generate the reception timestamp of the received packet 211, the packet filtering unit 203 sends a trigger signal 212 to provide a notification about the received packet 211 to the timestamp generation unit 204. The packet 211 determined to be the packet that should be received by the communication apparatus 100 is transferred to the MAC 202 by the packet filtering unit 203.

The timestamp generation unit 204 latches the time supplied from the time generation unit 206 at the timing of receiving the trigger signal 212 from the packet filtering unit 203, and provides a notification about the latched time to the MAC 202 as a reception timestamp 213 of the packet. This enables the MAC 202 to receive the packet 211 received from the network and the reception timestamp 213 of the packet in an associated manner.

On the other hand, in the case of transmitting a packet, the MAC 202 transfers a packet 214 to be transmitted to the PHY 201. In the case of transferring the packet 214 to the PHY 201, the MAC 202 transmits a trigger signal 215 to the timestamp generation unit 204. The timestamp generation unit 204 latches the time supplied from the time generation unit 205 at the timing of receiving the trigger signal 215 from the MAC 202, and provides a notification about the latched time to the MAC 202 as a transmission timestamp (time information indicating a transmission timing) 216 of the packet.

A time adjustment procedure in the PHC 205 will now be described. The time generation control unit 207 includes a setting register configured to adjust the time (specifically, time of the PHC 205) measured by the time generation unit 206, and adjusts the time of the time generation unit 206 using a value set in the setting register. The value set in the setting register corresponds to an adjustment parameter value to be described below.

Time adjustment methods mainly include two types of adjustments, i.e., phase adjustment and frequency adjustment. The phase adjustment is a method of advancing or turning back (adjusting) the current time by the amount (offset) corresponding to a time difference based on the value set in the setting register. The frequency adjustment is a method of accelerating or decelerating the rate of time or the rate of time measurement.

In the configuration example illustrated in FIG. 2, the MAC 202, the packet filtering unit 203, the timestamp generation unit 204, and the PHC 205 are illustrated as different hardware blocks. Alternatively, the MAC 202 may be configured to incorporate the packet filtering unit 203, the timestamp generation unit 204, and the PHC 205 as hardware blocks.

(Connection Configuration for Time Synchronization Processing)

Figures 3A, 3B:
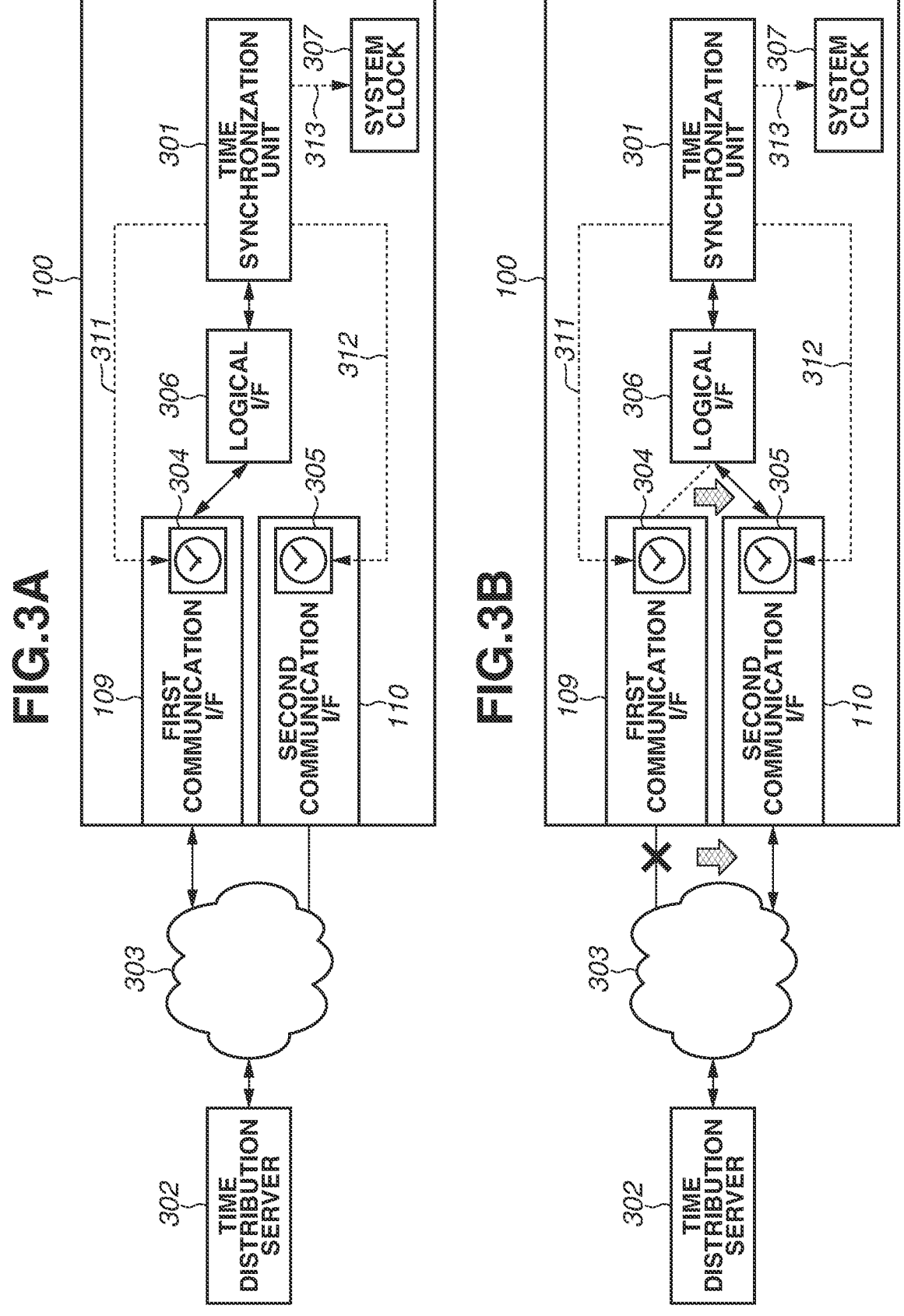
FIGS. 3A and 3B are block diagrams each illustrating a functional configuration for time synchronization processing in the communication apparatus according to the first exemplary embodiment.

Next, a connection configuration for time synchronization processing between the communication apparatus 100 and the time distribution server will be described with reference to FIGS. 3A and 3B. FIGS. 3A and 3B are block diagrams each illustrating a functional configuration for time synchronization processing in the communication apparatus 100 according to the present exemplary embodiment. FIG. 3A illustrates a functional configuration for establishing packet communication using the first communication I/F 109, and FIG. 3B illustrates a functional configuration for establishing packet communication using the second communication I/F 110 instead of the first communication I/F 109.

In the configuration illustrated in FIG. 3A, a time distribution server 302 that is connected to the communication apparatus 100 via a network 303 includes a function of distributing (providing) a reference time and is also called a grand master clock (GMC). The communication apparatus 100 includes the first communication I/F 109 and the second communication I/F 110 as described above with reference to FIG. 1. The first communication I/F 109 and the second communication I/F 110 are each connected to the network 303.

The first communication I/F 109 and the second communication I/F 110 include a PHC 304 and a PHC 305, respectively. The PHC 304 and the PHC 305 each have a configuration similar to the configuration of the PHC 205 described above with reference to FIG. 2. A time synchronization unit 301 executes PTP packet communication with the time distribution server 302 via the network 303. The time synchronization unit 301 is implemented as software to be executed by the CPU 102.

A logical I/F 306 is a logical (virtual) network interface that aggregates the first communication I/F 109 and the second communication I/F 110 as physical communication I/Fs. The logical I/F 306 is implemented by a driver called bonding. Bonding is a software technique for aggregating a plurality of physical communication I/Fs to enable handling of the plurality of physical communication I/Fs as a single logical network interface. Bonding includes a plurality of operation modes and is used based on the set operation mode. The operation modes may be preliminarily set in the communication apparatus 100, or may be set by an operator via the user I/F 105.

In the present exemplary embodiment, the logical I/F 306 is used in the operation mode of an active/backup method. The active/backup method is the operation mode for controlling one of the aggregated physical communication I/Fs to operate as an active I/F and controlling the other communication I/F to operate as a backup I/F. The communication I/F operating as the active I/F (hereinafter also referred to as an active communication I/F) transmits and receives packets for application communication. On the other hand, the communication I/F operating as the backup I/F (hereinafter also referred to as a backup communication I/F) does not transmit and receive packets for application communication. However, the backup communication I/F also remains connected to the network. If link-down occurs in the connection of the active communication I/F, the logical I/F 306 switches the communication I/F (i.e., active communication I/F) for executing packet transmission and reception to the backup communication I/F. With this configuration, a redundant network connection in which application communication can be continued even when the physical communication I/F to be used is switched can be achieved.

FIG. 3A illustrates that the logical I/F 306 causes the first communication I/F 109 to operate as the active communication I/F and causes the second communication I/F 110 to operate as the backup communication I/F. In other words, packets to be transmitted and received via the network 303 are transferred between the logical I/F 306 and the first communication I/F 109. The second communication I/F 110 functioning as the backup communication I/F is connected to the network 303, but is not used to transmit and receive packets. Thus, in the communication apparatus 100 illustrated in FIG. 3A, the use of the logical I/F 306 makes it possible to provide a redundant communication line using a line to which the first communication I/F 109 (active communication I/F) is connected as a main line and a line to which the second communication I/F 110 (backup communication I/F) is connected as a backup line.

In the connection state illustrated in FIG. 3A, if the communication apparatus 100 transmits and receives PTP packets to and from the time distribution server 302, the time synchronization unit 301 transmits and receives PTP packets via the logical I/F 306. The first communication I/F 109 functioning as the active communication I/F transmits and receives PTP packets via the network 303. The transmission timestamp of PTP packets indicates the time of the PHC 304 during transmission via the first communication I/F 109 functioning as the active communication I/F, and the reception timestamp of PTP packets indicates the time of the PHC 304 during reception via the first communication I/F 109 functioning as the active communication I/F. The transmission timestamp and the reception timestamp are sent to the logical I/F 306 from the first communication I/F 109. The time synchronization unit 301 receives the transmission timestamp and the reception timestamp of PTP packets from the logical I/F 306.

In time synchronization processing based on the PTP, time adjustment processing is generally performed on a hardware clock in the communication I/F that transmits and receives PTP packets. In the present exemplary embodiment, the time of the PHC 304 in the first communication I/F 109 functioning as the active communication I/F that transmits and receives packets via the network 303 is adjusted. In the configurations illustrated in FIGS. 3A and 3B, a dashed arrow 311 from the time synchronization unit 301 indicates that the time synchronization unit 301 adjusts the time of the PHC 304 in the first communication I/F 109. The time synchronization unit 301 adjusts the PHC 304 to synchronize the time of the PHC 304 in the first communication I/F 109 with the time of the time distribution server 302. Specifically, the time synchronization unit 301 calculates a time difference between the time of the time distribution server 302 and the time measured by the PHC 304, and executes phase adjustment or frequency adjustment on the PHC 304 so as to decrease the time difference.

In the present exemplary embodiment, as indicated by a dashed arrow 312 from the time synchronization unit 301, the time synchronization unit 301 also adjusts the time of the PHC 305 in the second communication I/F 110 functioning as the backup communication I/F. In this case, the time synchronization unit 301 also executes phase adjustment or frequency adjustment on the PHC 305 in the second communication I/F 110 in the same manner as in the phase adjustment or frequency adjustment executed on the PHC 304 in the first communication I/F 109. Specifically, the time of the PHC 304 is adjusted using the adjustment parameter value determined for the PHC 304, and the time of the PHC

305 is also adjusted. Thus, the number of adjustments performed on the PHC 304 is the same as the number of adjustments performed on the PHC 305, so that the time of the PHC 304 in the first communication I/F 109 and the time of the PHC 305 in the second communication I/F 110 are synchronized with the time of the time distribution server 302.

As indicated by a dashed arrow 3B from the time synchronization unit 301, the time synchronization unit 301 also adjusts a system clock 307. The system clock 307 is a software clock that measures time using timer hardware incorporated in the CPU 102. The time synchronization unit 301 executes processing of adjusting the time of the system clock 307 with the time of the PHC 304 with reference to the time of the PHC 304.

In the connection state illustrated in FIG. 3A, if a line failure or the like has occurred in the first communication I/F 109, the logical I/F 306 detects a link-down state of the first communication I/F 109, and switches the active communication I/F to the second communication I/F 110.

Specifically, as illustrated in FIG. 3B, the transfer of packets to be transmitted and received via the network 303 between the logical I/F 306 and the first communication I/F 109 is interrupted, and the transfer is switched to the transfer between the logical I/F 306 and the second communication I/F 110. After switching, the transmission and reception of PTP packets via the second communication I/F 110 are executed. The transmission timestamp of PTP packets indicates the time of the PHC 305 during transmission via the second communication I/F 110 functioning as the active communication I/F, and the reception timestamp of PTP packets indicates the time of the PHC 305 during reception via the second communication I/F 110 functioning as the active communication I/F. The transmission timestamp and the reception timestamp are sent to the logical I/F 306 from the second communication I/F 110. The time synchronization unit 301 receives the transmission timestamp and the reception timestamp of PTP packets from the logical I/F 306. The time synchronization unit 301 performs PTP packet communication via the logical I/F 306, thereby making it possible to continuously perform PTP packet communication without the influence of the link-down state of the first communication I/F 109.

As described above, the time synchronization unit 301 synchronizes the time of the PHC 304 and the time of the PHC 305 with the time of the time distribution server 302 before the logical I/F 306 switches the active communication I/F to the second communication I/F 110. Accordingly, even when the PHC that provides a notification about the timestamp of PTP packets is switched from the PHC 304 to the PHC 305, the time difference between the PHC and the time distribution server 302 does not vary greatly. In other words, it is possible to prevent the synchronized state with the time of the time distribution server 302 from being lost after the active communication I/F is switched.

In the present exemplary embodiment, the time synchronization unit 301 adjusts not only the time of the PHC 305 that measures the time indicated by the transmission timestamp and the time indicated by the reception timestamp after switching, but also the time of the PHC 304 in the first communication I/F 109 in the link-down state (as indicated by dashed arrows 311 and 312). In other words, the time synchronization unit 301 also executes phase adjustment or frequency adjustment on the PHC 304 in the first communication I/F 109 in the same manner as in the phase adjustment or frequency adjustment executed on the PHC 305 in the second communication I/F 110. This makes it possible to prevent the time synchronized state from being lost even when the connection state of the first communication I/F 109 is restored and the logical I/F 306 switches the active communication I/F to the first communication I/F 109 again.

(Time Synchronization Processing Flow)

Figure 4:
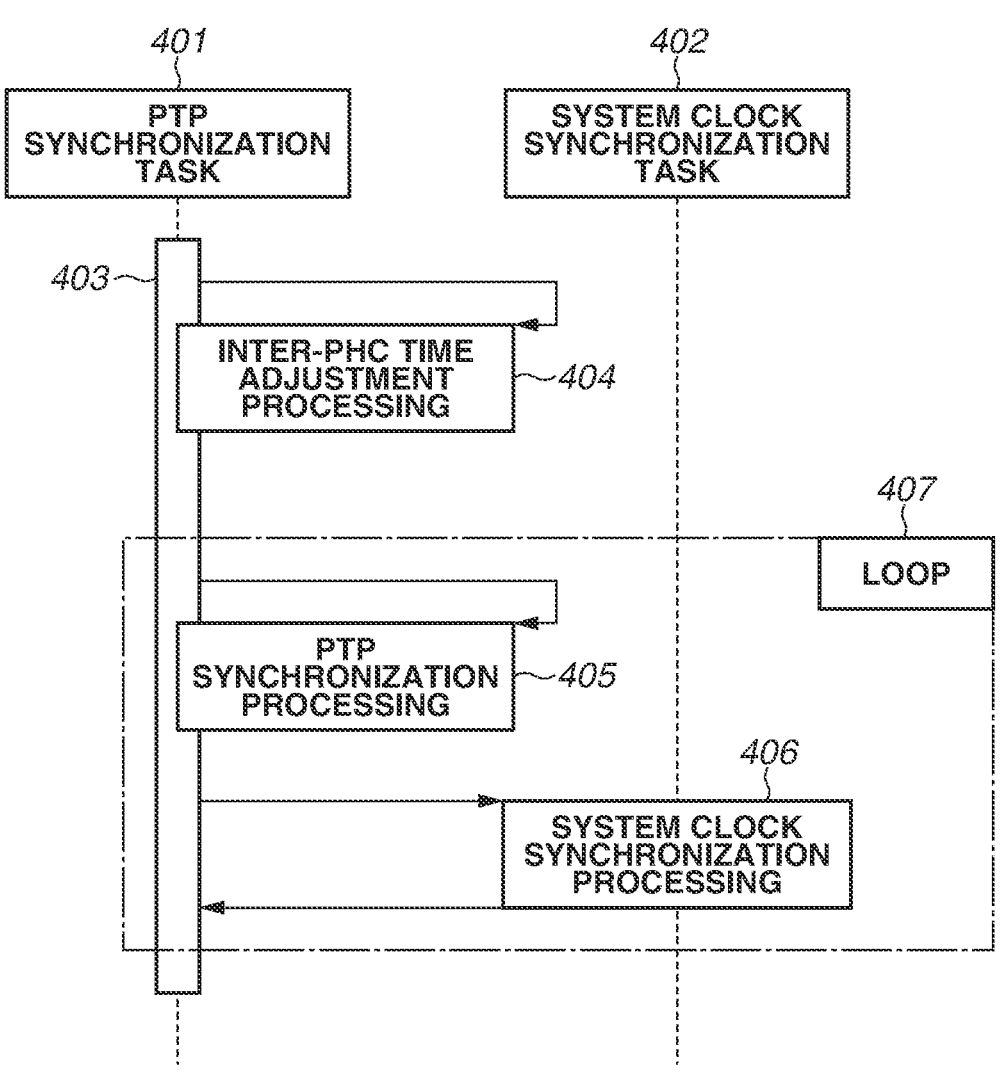
FIG. 4 illustrates an internal sequence of time synchronization processing to be executed by a time synchronization unit.

Next, a time synchronization processing flow to be executed by the time synchronization unit 301 will be described. FIG. 4 illustrates an internal sequence of time synchronization processing to be executed by the time synchronization unit 301. The time synchronization processing includes two tasks, i.e., a PTP synchronization task 401 and a system clock synchronization task 402. First, the PTP synchronization task 401 is started. After the PTP synchronization task 401 is started, the PTP synchronization task 401 remains in an execution state 403.

First, the PTP synchronization task 401 executes inter-PHC time adjustment processing 404. The inter-PHC time adjustment processing 404 is processing of synchronizing the times of all physical communication I/Fs included in the communication apparatus 100. For example, referring to FIG. 3A, the inter-PHC time adjustment processing 404 includes processing of synchronizing the time of the PHC 305 with the time of the PHC 304. In this case, the PTP synchronization task 401 adjusts the time of each PHC so that the times of the PHCs advance at substantially the same rate. This rate of time is a reference rate in time synchronization processing based on the PTP in a state where no adjustment is performed. If the PHC includes a function of changing the rate of time when the adjustment is reset, the PTP synchronization task 401 may adjust the time of each PHC using this function. Alternatively, the PTP synchronization task 401 may perform time synchronization between the PHCs with high accuracy by preliminarily setting a clock source of each PHC in an output signal from a common phase-locked loop (PLL) (phase synchronization circuit).

The PTP synchronization task 401 executes PTP synchronization processing 405 after the inter-PHC time adjustment processing 404. The PTP synchronization processing 405 is processing of executing PTP packet communication with the time distribution server 302 and adjusting the time of each PHC. The PTP synchronization processing 405 will be described below.

After the PTP synchronization processing 405, system clock synchronization processing 406 in the system clock synchronization task 402 is started. The system clock synchronization processing 406 is processing of selecting the communication I/F that is used as the active communication I/F by the logical I/F 306 and adjusting the time of the system clock 307 to be synchronized with the time of the PHC in the selected communication I/F. For example, referring to FIG. 3A, the system clock synchronization processing 406 adjusts the time of the system clock 307 to be synchronized with the time of the PHC 304 in the first communication I/F 109.

As indicated by a dashed-dotted frame 407, the PTP synchronization processing 405 and the system clock synchronization processing 406 are (repeatedly) executed in a loop. This enables the communication apparatus 100 to operate to be continuously synchronized with the time of the time distribution server 302.

Figure 5:
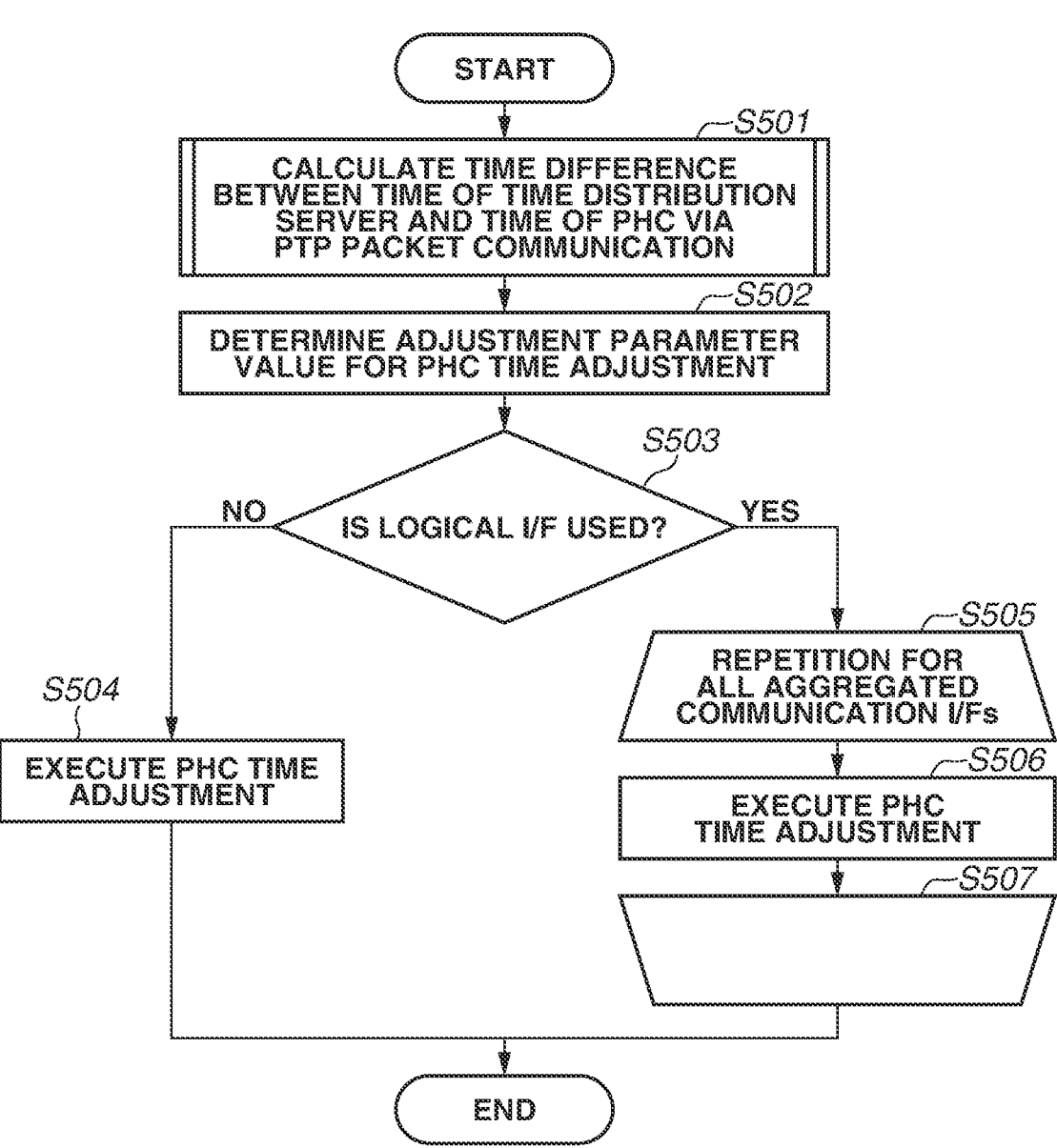
FIG. 5 is a flowchart illustrating precision time protocol (PTP) synchronization processing to be executed by the time synchronization unit.

The PTP synchronization processing 405 will be described with reference to FIG. 5. FIG. 5 is a flowchart illustrating the PTP synchronization processing 405 to be executed by the time synchronization unit 301. To facilitate description of FIG. 5, assume that the logical I/F 306 uses the first communication I/F 109 as the active communication I/F as illustrated in FIG. 3A.

First, in step S501, the time synchronization unit 301 executes PTP packet communication, and calculates a time difference between the time of the time distribution server 302 and the time of the PHC 304 in the first communication I/F 109. The PTP packet communication and the calculation of the time difference between the time of the time distribution server 302 and the time of the PHC 304 will be described with reference to FIG. 6.

Figure 6:
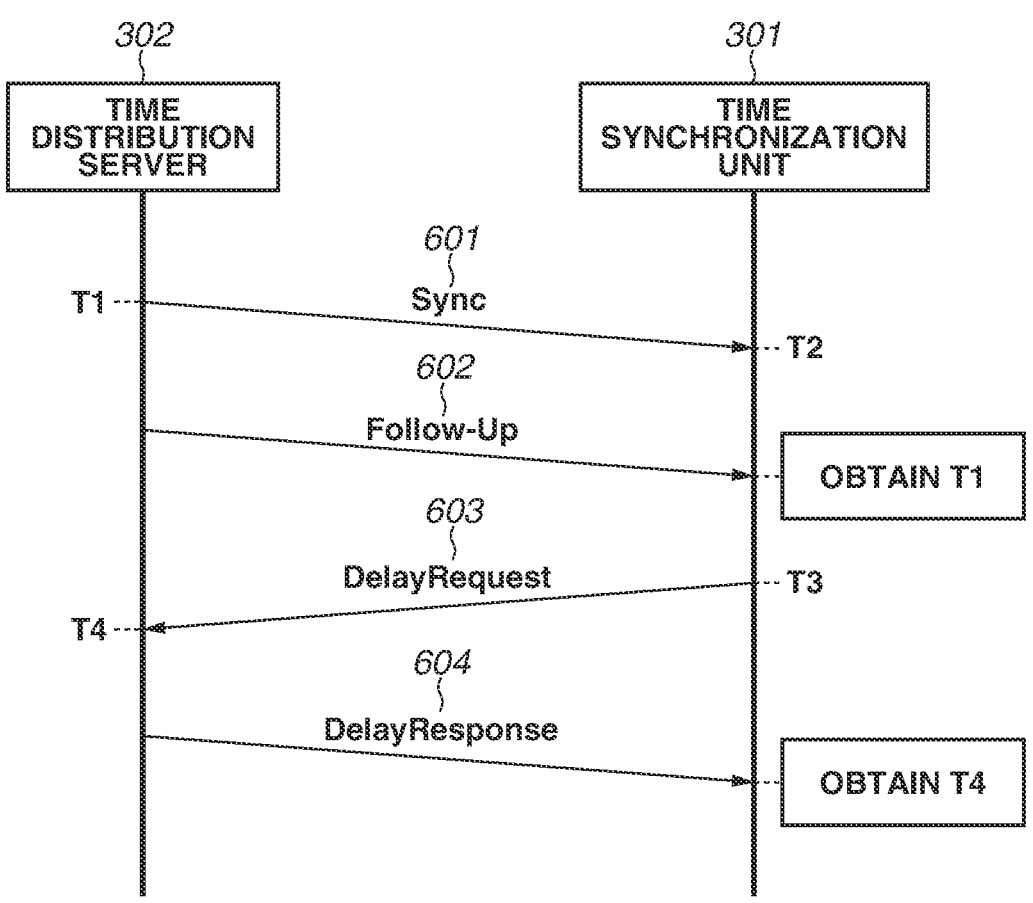
FIG. 6 illustrates a PTP packet communication sequence between the time synchronization unit and a time distribution server.

FIG. 6 illustrates a PTP packet communication sequence between the time synchronization unit 301 and the time distribution server 302. FIG. 6 illustrates only minimum necessary communication to calculate the time difference in step S501. First, the time synchronization unit 301 receives a Sync packet 601 that is transmitted periodically (e.g., every one second) from the time distribution server 302 by multicast transmission. The time distribution server 302 obtains the transmission timestamp during transmission of the Sync packet 601, and obtains a transmission time T1 of the Sync packet 601. The time synchronization unit 301 receives the Sync packet 601, and obtains the reception timestamp that is stamped at the time of the PHC 304 in the first communication I/F 109 (active communication I/F), thereby obtaining a reception time T2.

The time distribution server 302 transmits a Follow-Up packet 602 by multicast transmission. The transmission time T1 is described in the Follow-Up packet 602. The time synchronization unit 301 receives the Follow-Up packet 602 and obtains the transmission time T1. Next, the time synchronization unit 301 transmits a DelayRequest packet 603 to the time distribution server 302. The time synchronization unit 301 obtains a transmission time T3 as the transmission timestamp that is stamped at the time of the PHC 304 in the first communication I/F 109 during transmission of the DelayRequest packet 603.

The time distribution server 302 receives the DelayRequest packet 603 transmitted from the time synchronization unit 301. The time distribution server 302 obtains the reception timestamp during reception of the DelayRequest packet 603 and obtains a reception time T4. Further, the time distribution server 302 transmits a DelayResponse packet 604 to the communication apparatus 100 that has transmitted the DelayRequest packet 603. The time distribution server 302 describes the reception time T4 in the DelayResponse packet 604. The time synchronization unit 301 receives the DelayResponse packet 604 from the time distribution server 302, thereby obtaining the reception time T4.

The above-described communication enables the time synchronization unit 301 to obtain the times T1 to T4 and to obtain the time difference between the PHC 304 and the time distribution server 302 as represented by the following expression.

$$\text{Time Difference} = ((T2 - T1) - (T4 - T3))/2 \qquad (1)$$

Referring again to FIG. 5, in step S501, the time synchronization unit 301 calculates the time difference between the time of the time distribution server 302 and the time of the PHC 304 in the first communication I/F 109. Then, the processing proceeds to step S502. In step S502, the time synchronization unit 301 selects one of phase adjustment and frequency adjustment as the method for adjusting the time of the PHC 304, and determines a parameter value (adjustment parameter value) for adjustment. In the present exemplary embodiment, if the time difference calculated in step S501 is greater than a predetermined value, the time synchronization unit 301 selects the phase adjustment and determines the adjustment parameter value for phase adjustment. On the other hand, if the time difference calculated in step S501 is less than or equal to the predetermined value, the time synchronization unit 301 selects the frequency adjustment and determines the adjustment parameter value for frequency adjustment.

In particular, for example, immediately after PTP packet communication is started, there may be a large difference between the time of the PHC 304 and the time of the time distribution server 302. Accordingly, the time synchronization unit 301 sets, for example, 64 milliseconds as the predetermined value. If the time difference is greater than 64 milliseconds, the time synchronization unit 301 selects the phase adjustment. If the time difference is less than or equal to the predetermined value, the time synchronization unit 301 selects the frequency adjustment. The predetermined value used to compare the time difference may be preliminarily set in the communication apparatus 100, may be set by the operator through the user I/F 105, or may be set by the time synchronization unit 301 based on predetermined conditions.

In the phase adjustment, the current time of the PHC 304 is subtracted (time difference is added) by the amount corresponding to the time difference calculated in step S501. Specifically, if the phase adjustment is selected, the time synchronization unit 301 determines the time difference calculated in step S501 to be the adjustment parameter value.

On the other hand, in the frequency adjustment, the rate of time measured by the PHC 304 is adjusted. Specifically, if the frequency adjustment is selected, the time synchronization unit 301 determines a value based on the rate of time when the frequency adjustment is reset (that is, when no adjustment is performed) to be the adjustment parameter value. Specifically, when the frequency adjustment on the PHC 304 is reset, or when no adjustment is performed, 1,000,000,000 is set as a reference value for the rate of time for measuring one second. The time synchronization unit 301 calculates the rate at which the PHC 304 measures one second, and determines the calculated value to be the adjustment parameter value.

In the frequency adjustment, for example, if the calculated rate is 1,000,001,000, the adjustment is performed such that the adjusted time is one microsecond earlier than the time corresponding to a lapse of one second when no adjustment is performed. If the calculated rate is 999,999,000, the adjustment is performed such that the adjusted time is one microsecond later than the time corresponding to a lapse of one second when no adjustment is performed.

In step S502, the time synchronization unit 301 determines the adjustment parameter value. Then, the processing proceeds to step S503. In step S503, it is determined whether the time synchronization unit 301 uses the logical I/F 306 to transmit and receive PTP packets. If the logical I/F 306 is used (YES in step S503), the processing proceeds to step S505. If the logical I/F 306 is not used (NO in step S503), the processing proceeds to step S504. In the present exemplary embodiment, assume that the logical I/F 306 is used as described above with reference to FIGS. 3A and 3B.

In steps S505 to S507, the time synchronization unit 301 adjusts the time of each PHC for all physical communication I/Fs aggregated in the logical I/F 306. Specifically, the time synchronization unit 301 executes time adjustment processing on the PHC 304 and the PHC 305 using the adjustment parameter value determined in step S502.

In the phase adjustment, as described above, the time synchronization unit 301 subtracts the current time of each of the PHC 304 and the PHC 305 only by the adjustment parameter value.

In the frequency adjustment, the same adjustment parameter value is used for both the PHC 304 and the PHC 305. Accordingly, there is a possibility that the determined adjustment parameter value can exceed a value range in which the frequency adjustment of at least one of the PHC 304 and the PHC 305 can be performed. If it is determined that the determined adjustment parameter value exceeds the value range in which the frequency adjustment can be performed, the time synchronization unit 301 changes the adjustment parameter value to a limited adjustment parameter value with which the frequency adjustment can be performed on any PHC, and then performs the frequency adjustment.

The frequency adjustment of each PHC is actually dependent on PHC hardware specifications and driver software specifications. Accordingly, the adjustment parameter value determined in step S502 is converted into a setting value to be delivered to a hardware driver of each PHC, and then the frequency adjustment is performed.

After the processing of steps S505 to S507 is finished, this processing flow ends.

On the other hand, if the time synchronization unit 301 does not use the logical I/F 306 to transmit and receive PTP packets (NO in step S503), or if the time synchronization unit 301 directly uses the physical communication I/F to directly transmit and receive PTP packets, the processing proceeds to step S504. In step S504, the time synchronization unit 301 adjusts the time of the PHC in the communication I/F using the adjustment parameter value determined in step S502.

After the processing of step S504 is finished, this processing flow ends.

As described above, according to the present exemplary embodiment, in the plurality of physical communication I/Fs aggregated in the logical I/F, not only the time of the PHC in the active communication I/F, but also the time of the PHC in the backup communication I/F is synchronized with the time of the time distribution server 302. In other words, not only the time of the PHC in the communication control unit functioning as the active communication I/F, but also the time of the PHC in at least one communication control unit other than the communication control unit included in the communication apparatus 100 is synchronized with the time of the time distribution server 302. Consequently, it is possible to maintain the synchronized state with the time of the time distribution server 302 before and after the communication control unit (physical communication I/F) to be connected to the network 303 is switched.

(Hardware Configuration)

Figure 7:
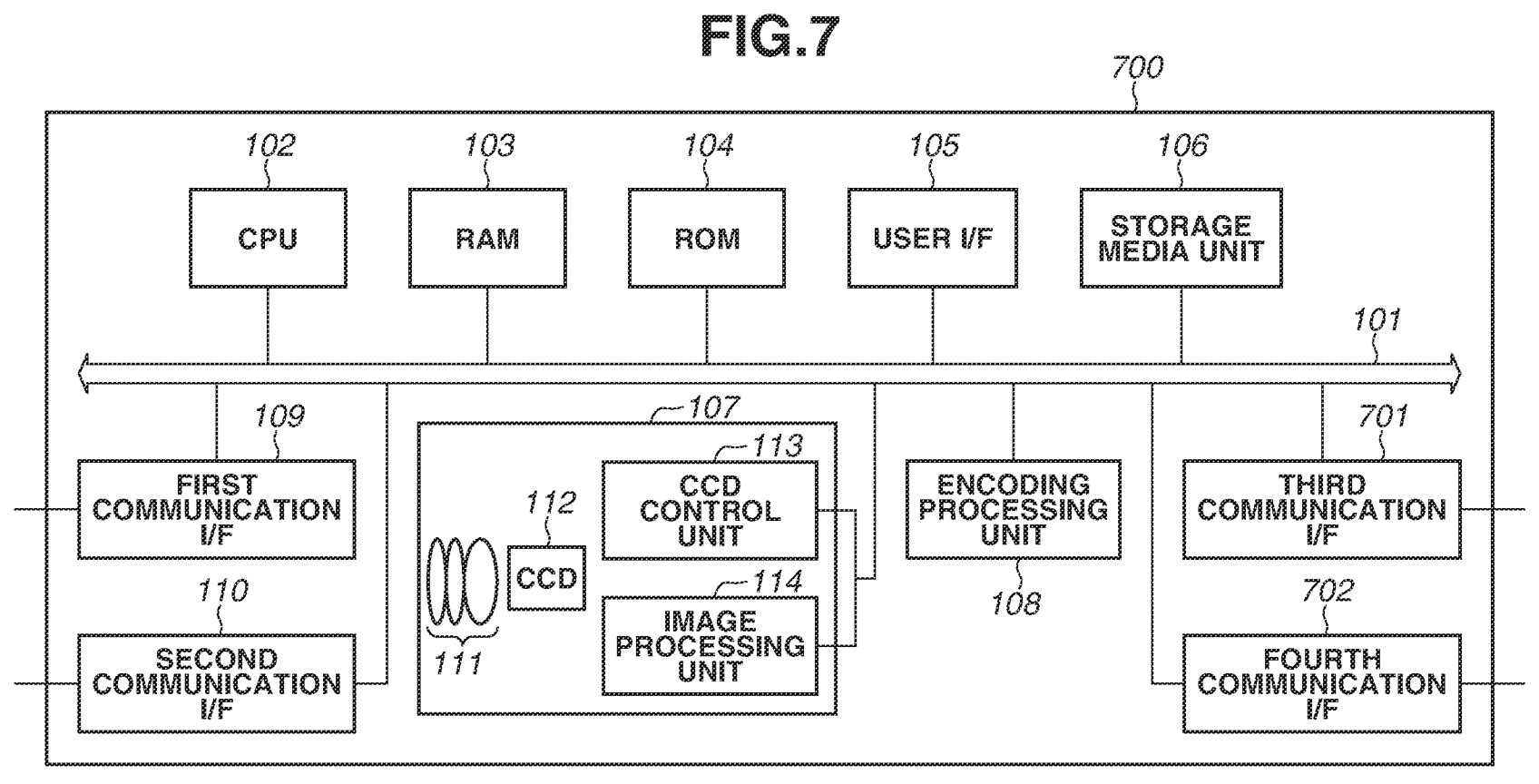

FIG. 7 is a block diagram illustrating a hardware configuration example of a communication apparatus 700 according to a second exemplary embodiment. Components similar to those of the communication apparatus 100 illustrated in FIG. 1 are denoted by the same reference numerals and the descriptions thereof are omitted. The communication apparatus 700 includes a third communication I/F 701 and a fourth communication I/F 702, in addition to the configuration of the communication apparatus 100. The third communication I/F 701 and the fourth communication I/F 702 each have a hardware configuration similar to that of the first communication I/F 109 illustrated in FIG. 2 described in the first exemplary embodiment.

(Connection Configuration for Time Synchronization Processing)

Figure 8:
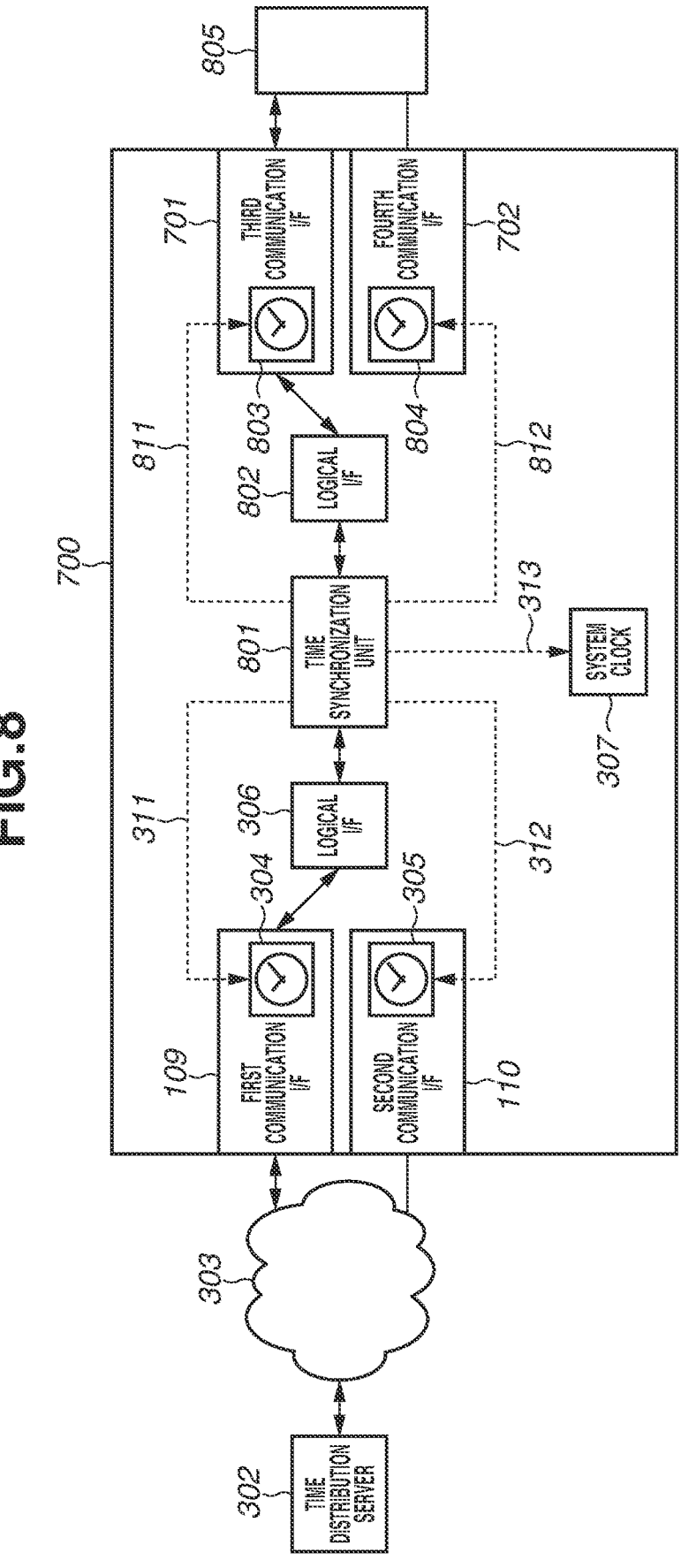
FIG. 8 is a block diagram illustrating a functional configuration for time synchronization processing in the communication apparatus according to the second exemplary embodiment.

Next, a connection configuration for time synchronization processing between the communication apparatus 700 and the time distribution server 302 will be described with reference to FIG. 8. FIG. 8 is a block diagram illustrating a functional configuration for time synchronization processing in the communication apparatus 700 according to the present exemplary embodiment. Components similar to those of the communication apparatus 100 illustrated in FIG. 3A are denoted by the same reference numerals and the descriptions thereof are omitted.

The communication apparatus 700 according to the present exemplary embodiment includes a logical I/F 802 that aggregates the third communication I/F 701 and the fourth communication I/F 702. The third communication I/F 701 and the fourth communication I/F 702 include a PHC 803 and a PHC 804, respectively. The PHC 803 and the PHC 804 each have a configuration similar to the configuration of the PHC 205 described above with reference to FIG. 2. The third communication I/F 701 and the fourth communication I/F 702 are each connected to another apparatus 805. The other apparatus 805 may have the configuration of the communication apparatus 100 according to the first exemplary embodiment, or the configuration of the communication apparatus 700 according to the present exemplary embodiment.

The logical I/F 802 is a logical (virtual) network interface and operates in the same manner as the logical I/F 306. Specifically, when the third communication I/F 701 and the fourth communication I/F 702 are connected to the other apparatus 805, the logical I/F 802 controls one of the third communication I/F 701 and the fourth communication I/F 702 to operate as the active I/F, and controls the other of the third communication I/F 701 and the fourth communication I/F 702 to operate as the backup I/F. FIG. 8 illustrates that the logical I/F 802 causes the third communication I/F 701 to operate as the active communication I/F and causes the fourth communication I/F 702 to operate as the backup communication I/F.

A time synchronization unit 801 includes a PTP packet transfer function called a transparent clock (TC) of a two-step mode, in addition to the function of the time synchronization unit 301 according to the first exemplary embodiment. The TC includes a function of calculating a detention period in the communication apparatus 700 during transfer of PTP packets, that is, a time required for reception of a PTP packet to transmission of the PTP packet, and adding and writing the detention period as a predetermined field value in the subsequent PTP packet.

Processing of the time synchronization unit 801 including the TC will be described in detail. The time synchronization unit 801 calculates the detection period during transfer of a Sync packet transmitted from the time distribution server 302 and stores the calculated detection period. Upon receiving the subsequent Follow-Up packet, the time synchronization unit 801 adds the stored detention period to CorrectionField in the Follow-Up packet, and transfers the Follow-Up packet to the other apparatus 805. Alternatively, the time synchronization unit 801 calculates and stores the detention period also during transfer of a DelayRequest packet to be sent to the time distribution server 302 from the other apparatus 805. Upon receiving the DelayResponse packet to be sent to the other apparatus 805 from the time distribution server 302, the time synchronization unit 801 adds the stored detention period to CorrectionField in the DelayResponse packet, and transfers the DelayResponse packet to the other apparatus 805.

A procedure for calculating the detention period will be described. The time synchronization unit 801 receives, from the logical I/F 306, a PTP packet to be multicast or to be sent to the other apparatus 805 from the time distribution server 302, and transmits the PTP packet to the logical I/F 802. The time synchronization unit 801 receives, from the logical I/F 802, the PTP packet to be sent to the time distribution server 302 from the other apparatus 805, and transmits the PTP packet to the logical I/F 306. In the PTP packet transfer processing as described above, the time synchronization unit 801 obtains the reception timestamp and the transmission timestamp and calculates the time difference between the reception timestamp and the transmission timestamp as the detention period.

For example, the transmission timestamp of the PTP packet transmitted from the time distribution server 302 is recorded at the time of the PHC 803 in the third communication I/F 701, and is sent to the logical I/F 802. Further, the time synchronization unit 801 obtains the transmission timestamp of the transferred packet from the logical I/F 802.

The communication apparatus 700 according to the present exemplary embodiment also synchronizes the times of the PHC 803 in the third communication I/F 701 and the PHC 804 in the fourth communication I/F 702, which are aggregated in the logical I/F 802, with the time of the PHC 304 so as to more accurately obtain the detention period in the communication apparatus 700 during transfer of PTP packets. Specifically, the time synchronization unit 801 adjusts the time of each of the PHC 305, the PHC 803, and the PHC 804 (as indicated by dashed arrows 311, 312, 811, and 812) using the adjustment parameter value determined for time adjustment to adjust the time of the PHC 304. The time adjustment processing described above enables the time synchronization unit 801 to obtain a more accurate detention period.

Like in the first exemplary embodiment, upon detecting the link-down state of the third communication I/F 701, the logical I/F 802 switches the active communication I/F to the fourth communication I/F 702. This makes it possible to prevent an adverse effect of switching of the physical communication I/F on the value of each of the transmission timestamp and the reception timestamp.

According to the above-described exemplary embodiments, in the case of switching a communication interface to be connected to a main line to a communication interface to be connected to a backup line to take over PTP packet communication, a synchronized state with the time of the time distribution server 302 before switching can be maintained.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102391, filed Jun. 27, 2022, which is hereby incorporated by reference herein in its entirety.

What is claimed is:

1. A communication apparatus including a plurality of communication control units each including a hardware clock, the communication apparatus comprising:

a determination unit configured to determine an adjustment parameter value to adjust a time of the hardware clock in a first communication control unit of the plurality of communication control units, based on a precision time protocol (PTP), the first communication control unit being configured to communicate with a time distribution server, the adjustment parameter value indicating a phase adjustment value and a frequency adjustment value, wherein the determination unit calculates a time difference between a time of the time distribution server and the time of the hardware clock in the first communication control unit based on the PTP, and determines the adjustment parameter value based on the time difference, and in a case where the time difference is greater than a predetermined value, the determination unit determines the adjustment parameter value for phase adjustment so that phase adjustment is used to adjust a current time of the hardware clock, and in a case where the time difference is less than or equal to the predetermined value, the determination unit determines the adjustment parameter value for frequency adjustment so that frequency adjustment is used to adjust a rate of the time of the hardware clock;

a first adjustment unit configured to adjust the time of the hardware clock in the first communication control unit using the adjustment parameter value; and a second adjustment unit configured to adjust a time of the hardware clock in at least one second communication control unit using the adjustment parameter value, the second communication control unit being included in the plurality of communication control units and being different from the first communication control unit.

2. The communication apparatus according to claim 1, wherein the plurality of communication control units is bonded together as a single logical communication control unit.

3. The communication apparatus according to claim 2, wherein in a case where the logical communication control unit detects that any one of the at least one second communication control unit is in a link-down state, the second adjustment unit adjusts a time of the hardware clock in the second communication control unit in the link-down state using the adjustment parameter value.

4. The communication apparatus according to claim 1, wherein the communication apparatus includes a transparent clock (TC) function.

5. The communication apparatus according to claim 4, wherein in the plurality of communication control units, at least two communication control units to be connected to the time distribution server are bonded together as a single first logical communication control unit, and in the plurality of communication control units, at least two communication control units to be connected to another communication apparatus are bonded together as a single second logical communication control unit.

6. The communication apparatus according to claim 1, further comprising a third adjustment unit configured to adjust a time of each hardware clock to synchronize the times of the hardware clocks in the plurality of communication control units before the adjustment parameter value is determined by the determination unit.

7. A control method for a communication apparatus including a plurality of communication control units each including a hardware clock, the control method comprising:

determining an adjustment parameter value to adjust a time of the hardware clock in a first communication control unit of the plurality of communication control units, based on a precision time protocol (PTP), the first communication control unit being configured to communicate with a time distribution server, the adjustment parameter value indicating a phase adjustment value and a frequency adjustment value, wherein determining the adjustment parameter value includes: calculating a time difference between a time of the time distribution server and the time of the hardware clock in the first communication control unit based on the PTP, and determining the adjustment parameter value based on the time difference, and in a case where the time difference is greater than a predetermined value, determining the adjustment parameter value for phase adjustment so that phase adjustment is used to adjust a current time of the hardware clock, and in a case where the time difference is less than or equal to the predetermined value, determining the adjustment parameter value for frequency adjustment so that frequency adjustment is used to adjust a rate of the time of the hardware clock;

adjusting, as a first adjustment, the time of the hardware clock in the first communication control unit using the adjustment parameter value; and adjusting, as a second adjustment, a time of the hardware clock in at least one second communication control unit using the adjustment parameter value, the second communication control unit being included in the plurality of communication control units and being different from the first communication control unit.

8. A non-transitory storage medium storing a program causing a communication apparatus including a plurality of communication control units each including a hardware clock to execute a control method, the control method comprising:

determining an adjustment parameter value to adjust a time of the hardware clock in a first communication control unit of the plurality of communication control units, based on a precision time protocol (PTP), the first communication control unit being configured to communicate with a time distribution server, the adjustment parameter value indicating a phase adjustment value and a frequency adjustment value, wherein determining the adjustment parameter value includes: calculating a time difference between a time of the time distribution server and the time of the hardware clock in the first communication control unit based on the PTP, and determining the adjustment parameter value based on the time difference, and in a case where the time difference is greater than a predetermined value, determining the adjustment parameter value for phase adjustment so that phase adjustment is used to adjust a current time of the hardware clock, and in a case where the time difference is less than or equal to the predetermined value, determining the adjustment parameter value for frequency adjustment so that frequency adjustment is used to adjust a rate of the time of the hardware clock;

adjusting, as a first adjustment, the time of the hardware clock in the first communication control unit using the adjustment parameter value; and adjusting, as a second adjustment, a time of the hardware clock in at least one second communication control unit using the adjustment parameter value, the second communication control unit being included in the plurality of communication control units and being different from the first communication control unit.

* * * * *